United States Patent
Yoshioka

(10) Patent No.: US 9,978,424 B2
(45) Date of Patent: May 22, 2018

(54) IMAGE PROCESSING APPARATUS

(71) Applicant: Taichi Yoshioka, Kanagawa (JP)

(72) Inventor: Taichi Yoshioka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/227,685

(22) Filed: Aug. 3, 2016

(65) Prior Publication Data

US 2017/0048425 A1 Feb. 16, 2017

(30) Foreign Application Priority Data

Aug. 10, 2015 (JP) .................. 2015-158319

(51) Int. Cl.
G06T 1/20 (2006.01)
G06T 1/60 (2006.01)
G11B 27/10 (2006.01)

(52) U.S. Cl.
CPC ............... G11B 27/10 (2013.01); G06T 1/20 (2013.01); G06T 1/60 (2013.01)

(58) Field of Classification Search
CPC ............. G06T 1/20; G06T 1/60; G11B 27/10
USPC ........................................ 345/530, 536, 559
See application file for complete search history.

(56) References Cited

U.S. PATENT DOCUMENTS

| | | | |
|---|---|---|---|
| 7,952,628 B2 | 5/2011 | Nishide et al. | |
| 8,817,341 B2 | 8/2014 | Yoshioka | |
| 8,885,200 B2 | 11/2014 | Yoshioka | |
| 2011/0156875 A1* | 6/2011 | Sugimura | G06F 15/8015 340/10.1 |
| 2012/0131315 A1* | 5/2012 | Tanaka | G06T 1/20 712/220 |
| 2012/0331313 A1 | 12/2012 | Yoshioka | |
| 2014/0139868 A1 | 5/2014 | Yoshioka | |
| 2016/0154603 A1 | 6/2016 | Yoshioka | |

FOREIGN PATENT DOCUMENTS

JP 2009-123091 6/2009
JP 5262047 8/2013

* cited by examiner

*Primary Examiner* — Jacinta M Crawford
(74) *Attorney, Agent, or Firm* — Duft Bornsen & Fettig LLP

(57) ABSTRACT

The image-processing apparatus for performing image processes based on parameters includes a first storage to which the parameters are input; a second storage for obtaining the parameters stored in the first storage after the input is finished; a third storage for storing the parameters stored in the second storage based on a first signal; a fourth storage for obtaining first parameters, of data stored in the third storage, related to a first image process based on a first trigger signal output at a predetermined timing and obtaining second parameters, of data stored in the third storage, related to a second image process based on a second trigger signal output at a predetermined timing; a first image-processing unit for performing the first image process based on the first parameters; and a second image-processing unit for performing the second image process based on the second parameters.

10 Claims, 12 Drawing Sheets

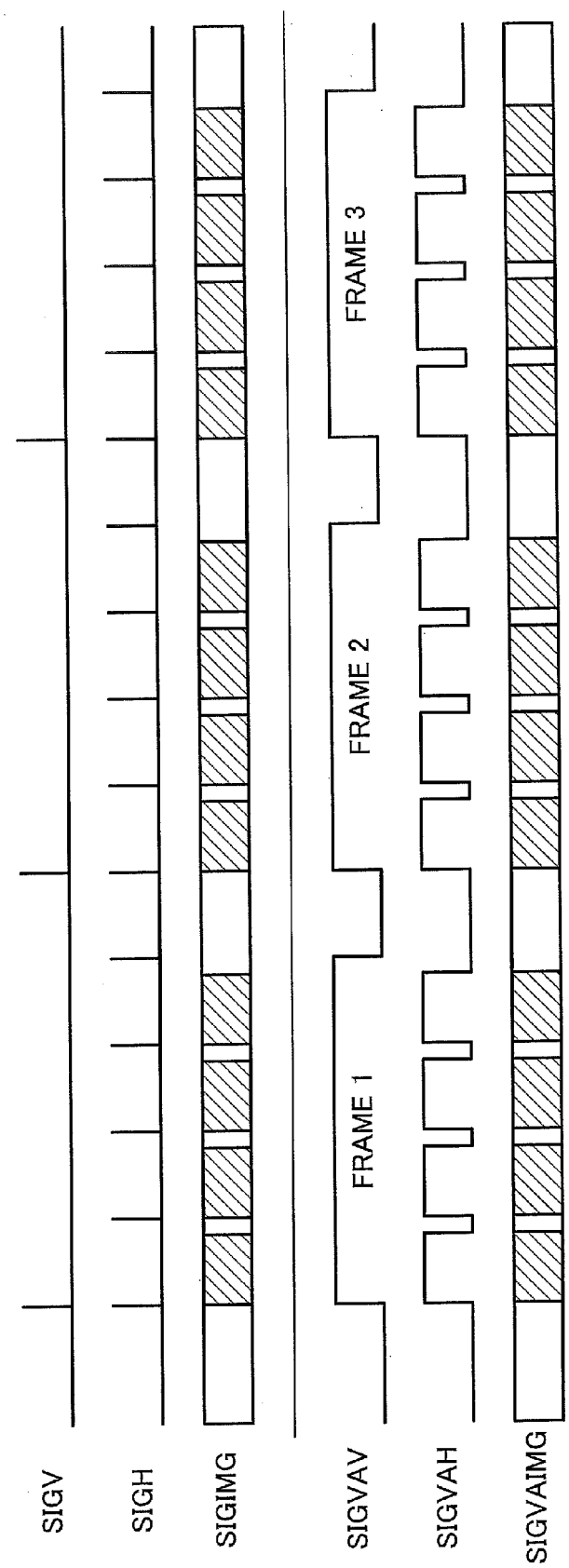

IMAGE PROCESSING APPARATUS

CROSS-REFERENCE TO RELATED APPLICATIONS

The present application is based on and claims the benefit of priority of Japanese Priority Application No. 2015-158319 filed on Aug. 10, 2015, the entire contents of which are hereby incorporated herein by reference.

BACKGROUND OF THE INVENTION

1. Field of the Invention

The present disclosure relates to an image processing apparatus.

2. Description of the Related Art

Conventionally, an image forming apparatus or the like is known in which image processes are performed for a plurality of frames included in image data such as a moving image. In this kind of an image forming apparatus, parameters related to the image process are often held in a register.

Further, a method is known in which, after the end-of-communication signal is input, the retained operation setting data is collectively latched according to the reflection timing control signal synchronizing with the vertical synchronization signal (e.g., Patent Document 1).

CITATION LIST

Patent Document

[Patent Document 1] Japanese Patent No. 5262047

SUMMARY OF THE INVENTION

An image processing apparatus for performing image processes based on parameters is provided. The image processing apparatus includes a first storage unit to which the parameters are input; a second storage unit configured to obtain the parameters stored in the first storage unit after the input is finished; a third storage unit configured to store the parameters stored in the second storage unit based on a first signal; a fourth storage unit configured to obtain first parameters, of data stored in the third storage unit, related to a first image process based on a first trigger signal output at a predetermined timing and obtain second parameters, of the data stored in the third storage unit, related to a second image process based on a second trigger signal output at a predetermined timing; a first image processing unit configured to perform the first image process based on the first parameters; and a second image processing unit configured to perform the second image process based on the second parameters.

According to an embodiment in the present disclosure, an image processing apparatus which is capable of performing image processes in the same frame by using the same parameters can be provided.

Other objects, features and advantages of the present invention will become more apparent from the following detailed description when read in conjunction with the accompanying drawings.

BRIEF DESCRIPTION OF THE DRAWINGS

FIG. 3 is a timing chart illustrating signals generated by an I/F conversion unit according to an embodiment.

DETAILED DESCRIPTION OF THE PREFERRED EMBODIMENTS

An object of the present disclosure is to provide an image processing apparatus which is capable of performing image processes in the same frame by using the same parameters.

In the following, embodiments of the present disclosure will be described referring to the accompanied drawings. It should be noted that in the specification and the drawings, elements which include substantially the same functional structure are given the same signs, and duplicated descriptions are omitted.

<Example of Image Processing Apparatus>

First, an example of an overall structure of an image processing apparatus according to an embodiment will be described.

Figure 1:
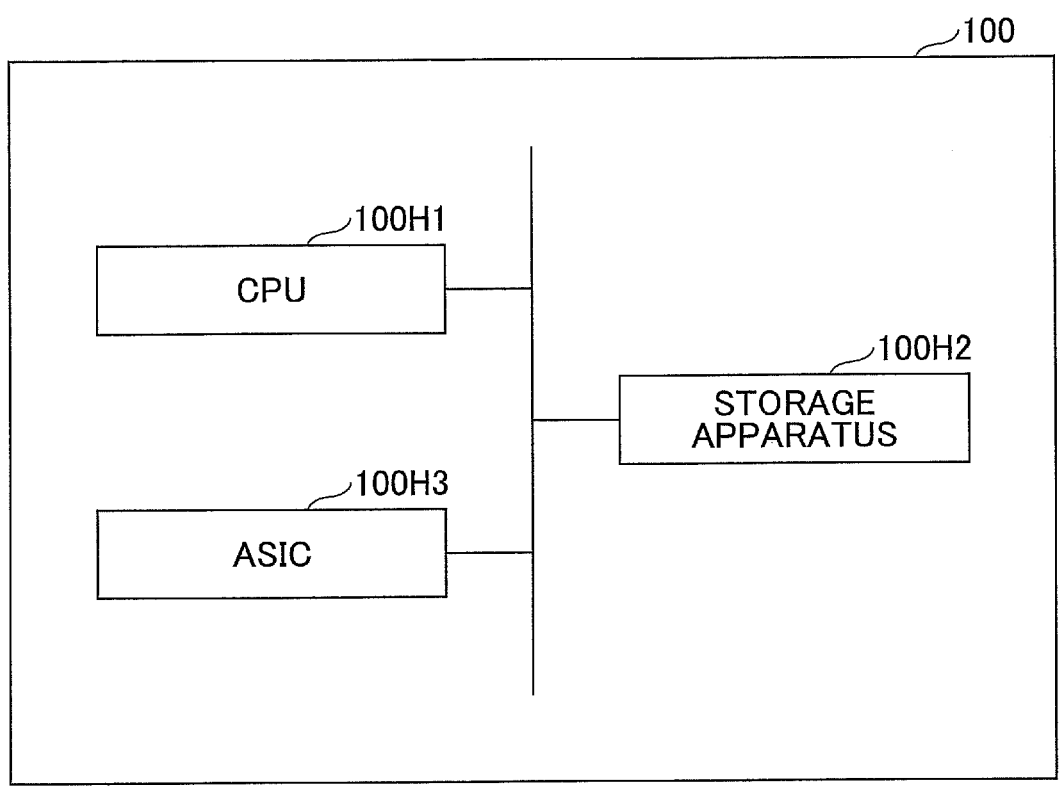
FIG. 1 is a block diagram illustrating an example of an overall structure of an image processing apparatus according to an embodiment in the present disclosure.

FIG. 1 is a block diagram illustrating an example of an overall structure of an image processing apparatus 100 according to an embodiment. Specifically, the image processing apparatus 100 includes a central processing unit (CPU) 100H1, a storage apparatus 100H2, and an application specific integrated circuit (ASIC) 100H3.

The CPU 100H1 is a calculation apparatus for performing calculation related to processes, data processing, etc., and a control apparatus for controlling hardware elements and apparatuses. It should be noted that the CPU 100H1 may include multiple apparatuses.

The storage apparatus 100H2 stores data, programs, settings, etc. Specifically, the storage apparatus 100H2 is a so-called memory, etc., and is a main storage apparatus, etc. It should be noted that the storage apparatus 100H2 may include an auxiliary storage apparatus such as a hard disk.

The ASIC 100H3 is an electronic circuit for performing calculation related to processes, data processing, etc., and for controlling hardware elements and apparatuses. For example, a control signal, an image data signal, etc., are output from the ASIC 100H3 to the apparatuses. It should be noted that a part or all of the ASIC 100H3 may be included in a programmable logic device (PLD) such as a field-programmable gate array (FPGA).

It should be noted that the image processing apparatus 100 is not limited to the hardware structure illustrated in the figure. The image processing apparatus 100 may further include an apparatus to support the hardware elements.

In the following, an example will be described in which the ASIC 100H3 performs image processes for image data input to the image processing apparatus 100. It should be noted that the image data includes multiple frames such as a moving image.

<Hardware Structure Example>

Figure 2:
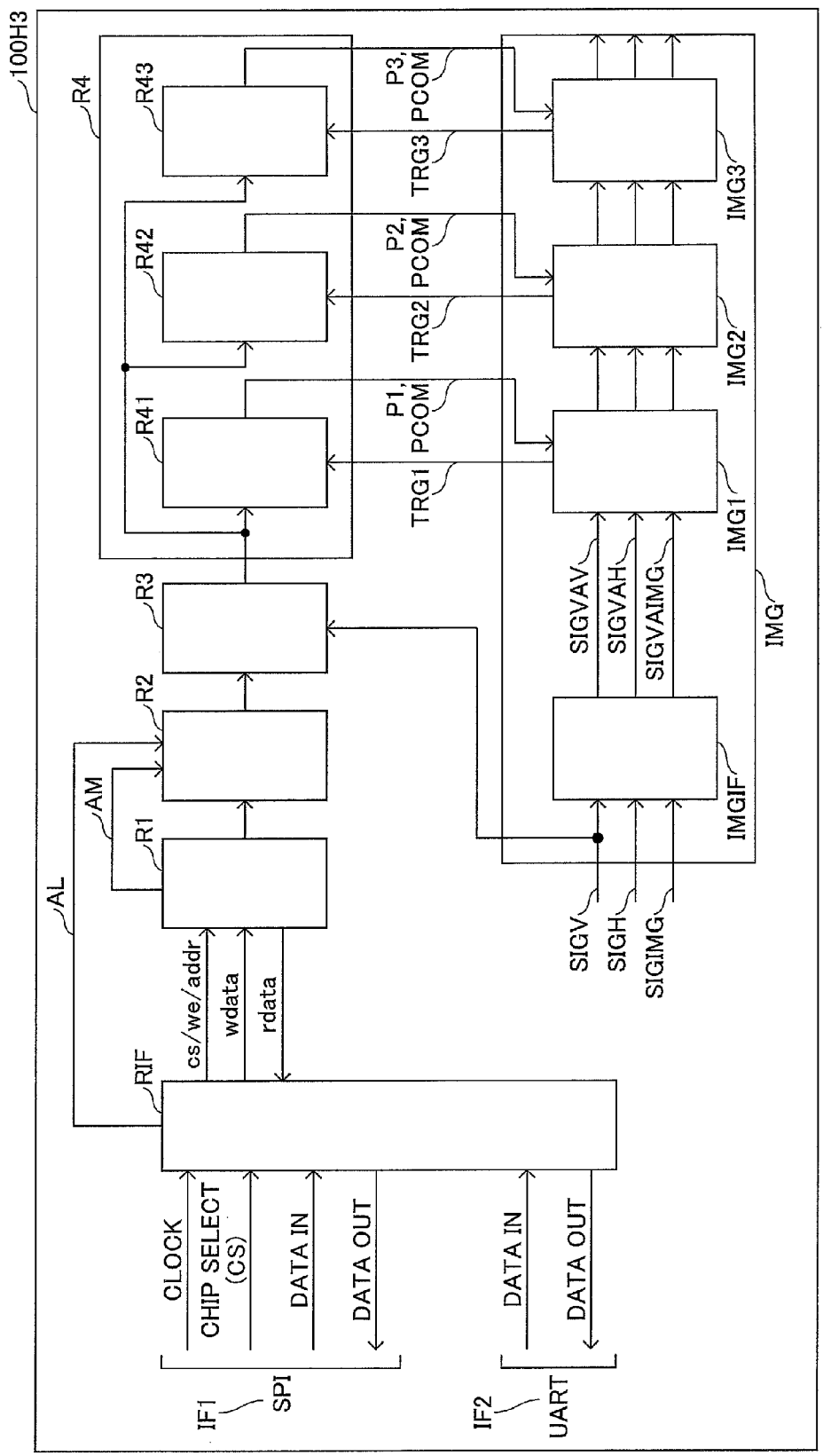
FIG. 2 is a block diagram illustrating an example of a hardware structure of an image processing apparatus according to an embodiment.

FIG. 2 is a block diagram illustrating an example of a hardware structure of an image processing apparatus according to an embodiment. FIG. 2 illustrates a hardware structure example of the ASIC 100H3. Specifically, the ASIC 100H3 includes a register access interface (I/F) RIF. Further, The ASIC 100H3 includes a first register R1 as an example of a first storage unit, a second register R2 as an example of a second storage unit, a third register R3 as an example of a third storage unit, and a fourth register R4 as an example of a fourth storage unit. Further, The ASIC 100H3 includes an image processing unit IMG for performing multiple image processes.

The register access I/F RIF is a register I/F positioned between the CPU 100H1 (FIG. 1) and the ASIC 100H3. The register access I/F RIF includes a serial peripheral interface (SPI) IF1, etc., as an example of a first interface for performing burst transfer. Further, the register access I/F RIF includes a universal asynchronous receiver transmitter (UART) IF2, etc., as an example of a second interface.

The SPI IF1 is an example of an I/F which is capable of performing burst transfer and performs serial transfer. Therefore, the SPI IF1 is capable of continuously accessing consecutive addresses. In other words, when performing burst transfer, a part of an address input process, etc., can be omitted. It should be noted that when burst transfer is being performed, a chip select (cs) signal is kept asserted. Further, an I/F for the first register R1 includes the chip select (cs), a write enable (we), an address (addr), a write data (wdata), and a read data (rdata). By using the cs, we, addr, wdata, and rdata, accesses of read and write for the first register R1 are performed.

The UART IF2 is used for debugging, etc., during, for example, product development or product evaluation. By using the UART IF2, the registers can be accessed from a personal computer (PC), etc.

Read and write of the first register R1 is performed by an access from the register access I/F RIF. Further, parameters stored in the first register R1 are updated to newly input parameters when the new parameters are input by a write access from the register access I/F RIF. It should be noted that the update target parameters are identified by addresses. In the first register R1, dedicated parameters to be used by corresponding modules which perform respective image processes are stored in corresponding registers, and common parameters to be used in common by the modules are stored in corresponding registers.

The second register R2 obtains and stores the parameters stored in the first register R1. In other words, the contents of the registers included in the first register R1 are reflected to the registers included in the second register R2. The second register R2 obtains the parameters stored in the first register R1 when the write access which is an input to the first register R1 is finished. In other words, the second register R2 obtains the parameters when an end of the burst transfer, which is an access from the register access I/F RIF to the first register R1, is reported.

It should be noted that the ASIC 100H3 may determine whether the access is an access according to the SPI IF1 or an access according to the UART IF2. For example, the first register R1 may include a register for setting an access mode (AM). In other words, the ASIC 100H3 determines whether the access is an access according to the SPI IF1 or an access according to the UART IF2 according to an value of the register indicating an access mode (AM). Further, the ASIC 100H3 may determine whether the access is according to the SPI IF1 or according to the UART IF2 according to the register access I/F RIF.

Regarding the access according to the UART IF2, there is a case where an alert (AL) is not performed. As a result, the second register R2 is updated at different timings depending on the access according to the UART IF2 or the access according to the SPI IF1. For example, when it is determined that the access is according to the UART IF2, the second register R2 is updated without condition. It should be noted that the second register R2 includes registers, of the registers included in the first register R1, which store parameters which may be updated during operations. As a result, it is necessary for the register access to be stopped during a frame period in the case where it is determined that the access is according to the UART IF2.

Triggered by an input vertical synchronization signal SIGV as an example of a first signal input to the image processing unit IMG, the third register R3 obtains and stores the parameters stored in the second register R2. With the above operation, the third register R3 is updated, and the contents of the third register R3 become the same as the second register R2.

The fourth register R4 stores the parameters used by the modules. Further, the fourth register R4 includes registers for each module. For example, in the case where three image processes are performed by the image processing unit IMG, the image processing unit IMG includes a first module IMG1, a second module IMG2, and a third module IMG3. In other words, the modules perform corresponding image processes. In the following, as illustrated in the figure, an example will be described in which the image processing unit IMG performs three image processes. Further, it is assumed in the example that the image processes are performed by the first module IMG1, the second module IMG2, and the third module IMG3, in this order.

In this case, the fourth register R4 includes a first module register R41, a second module register R42, and a third module register R43. In other words, the first module register R41 stores parameters related to a first image process performed by the first module IMG1. It should be noted that when the first module IMG1 is an example of a first image processing unit, the parameters stored in the first module register R41 are an example of first parameters P1. Similarly, the second module register R42 stores parameters related to a second image process performed by the second module IMG2. It should be noted that when the second module IMG2 is an example of a second image processing unit, the parameters stored in the second module register R42 are an example of second parameters P2. Further, the third module register R43 stores parameters related to a third image process performed by the third module IMG3.

It should be noted that trigger signals are output to the module registers included in the fourth register R4 from the corresponding modules. Specifically, a first trigger signal TRG1 is output to the first module register R41 from the first module IMG1. Similarly, a second trigger signal TR2 is output to the second module register R42 from the second module IMG2, and a third trigger signal TR3 is output to the third module register R43 from the third module IMG3. Next, when the trigger signals are output, the corresponding module registers obtain parameters from the third register R3, and thus, the module registers are updated.

In other words, the registers are illustrated in the table below (Table 1).

TABLE 1

|  |  | FIRST REGISTER | SECOND REGISTER | THIRD REGISTER | FOURTH REGISTER | | |
|---|---|---|---|---|---|---|---|
|  |  |  |  |  | FIRST MODULE REGISTER | SECOND MODULE REGISTER | THIRD MODULE REGISTER |
| REGISTER NOT UPDATED DURING OPERATION |  | TRUE | FALSE | FALSE | FALSE | FALSE | FALSE |
| REGISTER UPDATED DURING OPERATION | COMMON PARAMETER | TRUE | TRUE | TRUE | TRUE | TRUE | TRUE |
|  | PARAMETER FOR FIRST MODULE | TRUE | TRUE | TRUE | TRUE | FALSE | FALSE |
|  | PARAMETER FOR SECOND MODULE | TRUE | TRUE | TRUE | FALSE | TRUE | FALSE |
|  | PARAMETER FOR THIRD MODULE | TRUE | TRUE | TRUE | FALSE | FALSE | TRUE |

In the above table (Table 1), whether the registers are updated during operation is indicated by "TRUE" or "FALSE". The first register R1 is a register which is not updated during operation. All other registers are updated during operation. Further, as illustrated in the above table (Table 1), the common parameter is stored in all registers. On the other hand, parameters for each module such as the first parameters P1, the second parameters P2, etc., are stored in the corresponding module register. For example, the first module register R41 stores common parameters PCOM and the first parameters P1. That is, the first module register R41 stores parameters necessary for the first module IMG1 to perform corresponding image process, and the first module IMG1 performs the image process by using the first parameters P1 and the common parameters PCOM.

The image processing unit IMG performs the image process for an image input by the input image data signal SIGIMG. The image process includes, for example, black correction, gamma conversion, gain adjustment, various kinds of filtering, etc. It should be noted that the kinds of the image processes are not limited to the above, and other kinds of image processes may be performed. Further, the image processing unit IMG includes an I/F conversion unit IMGIF.

FIG. 3 is a timing chart illustrating an example of signals generated by the I/F conversion unit IMGIF according to an embodiment. As illustrated in FIG. 2, an input vertical synchronization signal SIGV for indicating the beginning of the frame of an input image, an input horizontal synchronization signal SIGH for indicating the beginning of the line of the input image, and the input image data signal SIGIMG are input to the image processing unit IMG.

As illustrated in FIG. 3, the input vertical synchronization signal SIGV is asserted at each of the beginning of the frames. It should be noted that, in FIG. 3, the input vertical synchronization signal SIGV is an example of a high-active signal. In other words, one frame starts when the input vertical synchronization signal SIGV becomes a high level and ends the next time the input vertical synchronization signal SIGV becomes a high level. For example, if it is assumed that a frame period is constant, then the input vertical synchronization signal SIGV is asserted at every period. For example, in the case where 30 frames per second are input, the input vertical synchronization signal SIGV is asserted at every "(1 second)/(30 frames)*(33 ms)".

Further, as illustrated in FIG. 3, the input horizontal synchronization signal SIGH is asserted at each of the beginning of the lines. It should be noted that, in FIG. 3, the input horizontal synchronization signal SIGH is an example of a high-active signal. In other words, one line starts when the input horizontal synchronization signal SIGH becomes a high level and ends the next time the input horizontal synchronization signal SIGH becomes a high level. For example, if it is assumed that a line period is constant, then the input horizontal synchronization signal SIGH is asserted at every period. For example, in the case where there are 480 lines in a frame, the input horizontal synchronization signal SIGH is asserted at every "(33 ms)/(480 lines)=(0.06875 ms)".

The input image data signal SIGIMG is a signal which indicates pixel values of corresponding pixels included in an image. It should be noted that, in FIG. 3, an area in which data of the pixel values exists is referred to as "effective area" (hereinafter, referred to as "effective area"), and indicated by hatched lines. In other words, other than the effective area, the input image data signal SIGIMG is, for example, a signal indicating a value of "zero".

The I/F conversion unit IMGIF generates a frame effective signal SIGVAV, a line effective signal SIGVAH, and an effective image data signal SIGVAIMG to be easily handled by the image processing unit IMG in the process. As illustrated in FIG. 2, the frame effective signal SIGVAV, the line effective signal SIGVAH, and the effective image data signal SIGVAIMG are, for example, output to the first module IMG1.

The frame effective signal SIGVAV is a high level signal in the case where lines of a frame including pixels of an effective area are being input. On the other hand, in the case where lines of a frame without including an effective area are being input, the frame effective signal SIGVAV is a low level signal.

The line effective signal SIGVAH is a high level signal in the case where pixels of a line including an effective area are being input. On the other hand, in the case where pixels of a line without including an effective area are being input, the line effective signal SIGVAH is a low level signal.

The frame effective signal SIGVAV is, similar to the input image data signal SIGIMG, a signal indicating pixel values of pixels included in the image.

<Overall Process Example>

FIGS. 4A through 4D are flowcharts illustrating examples of an overall process of an image processing apparatus according to an embodiment.

Figure 4A:
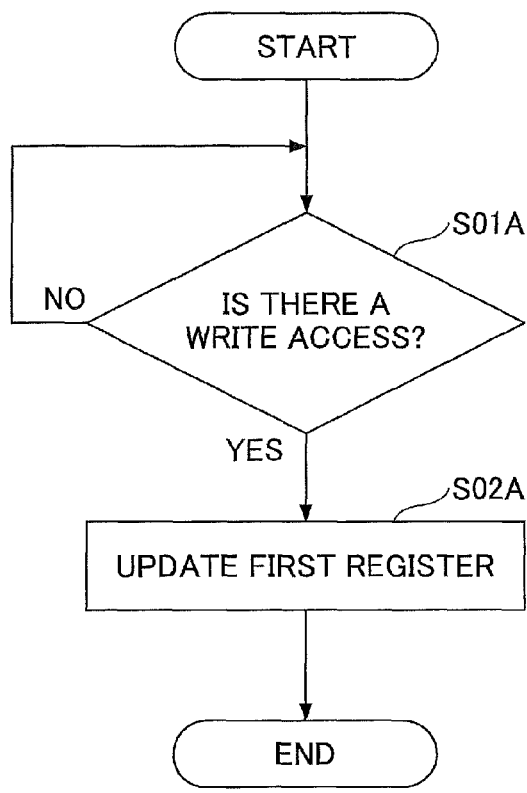
FIGS. 4A through 4D are flowcharts illustrating examples of an overall process of an image processing apparatus according to an embodiment.

FIG. 4A is a flowchart illustrating an example of a process of updating the first register R1 (FIG. 2).

In step S01A, the ASIC 100H3 (FIG. 2) determines whether there is a write access. When it is determined that there is a write access (YES in step S01A), the process of the ASIC 100H3 moves to step S02A. On the other hand, when it is determined that there is not a write access (NO in step S01A), the process of the ASIC 100H3 repeats step S01A.

In step S02A, the ASIC 100H3 updates the first register R1. Specifically, when there is a write access by the SPI IF1 (FIG. 2), the ASIC 100H3 updates registers of the first register R1, which registers are identified by address values input to the address addr (FIG. 2). Further, the first register R1 is updated to the parameters input by the write data wdata (FIG. 2).

Figure 4B:
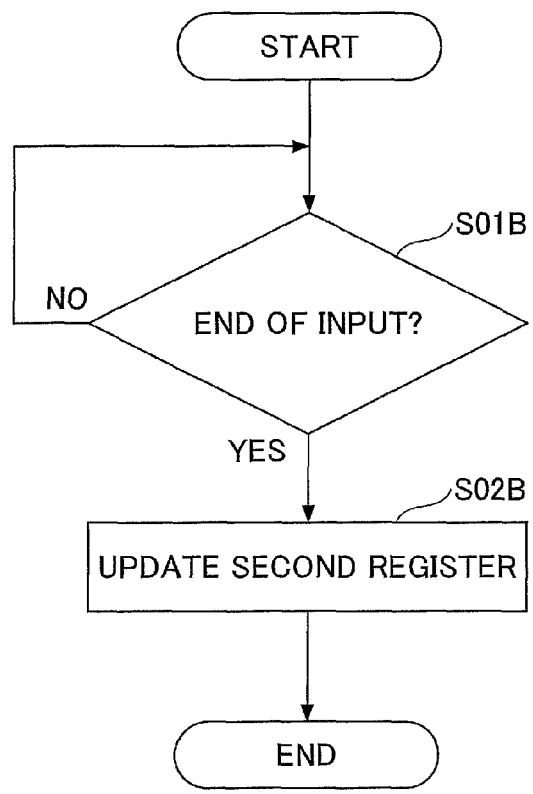

FIG. 4B is a flowchart illustrating an example of a process of updating the second register R2 (FIG. 2).

In step S01B, the ASIC 100H3 determines whether the input is finished. Specifically, the ASIC 100H3 determines whether the input is finished according to the alert (AL) (FIG. 2). For example, the alert (AL) is realized by a negation of the chip select (cs) signal, etc. When it is determined that the input is finished (YES in step S01B), the process of the ASIC 100H3 moves to step S02B. On the other hand, when it is determined that the input is not finished (NO in step S01B), the process of the ASIC 100H3 repeats step S01B.

In step S02B, the ASIC 100H3 updates the second register R2. Specifically, the ASIC 100H3 obtains parameters stored in the first register R1, and updates the second register R2 in such a way that the parameters stored in the first register R1 are reflected to the second register R2.

Figure 4C:
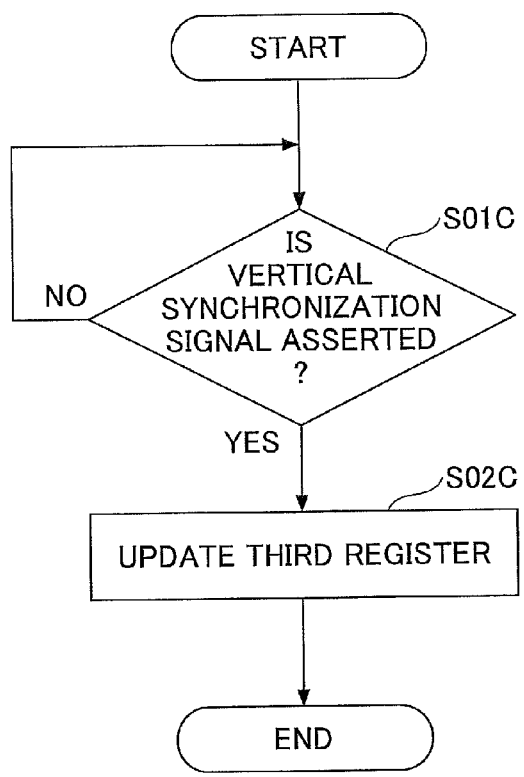

FIG. 4C is a flowchart illustrating an example of a process of updating the third register R3 (FIG. 3).

In step S01C, the ASIC 100H3 determines whether the input vertical synchronization signal SIGV is asserted. When it is determined that the input vertical synchronization signal SIGV (FIG. 2) is asserted (YES in step S01C), the process of the ASIC 100H3 moves to step S02C. On the other hand, when it is determined that the input vertical synchronization signal SIGV is not asserted (NO in step S01C), the process of the ASIC 100H3 repeats step S01C.

In step S02C, the ASIC 100H3 updates the third register R3. Specifically, the ASIC 100H3 obtains parameters stored in the second register R2, and updates the third register R3 in such a way that the parameters stored in the second register R2 are reflected to the third register R3.

Figure 4D:
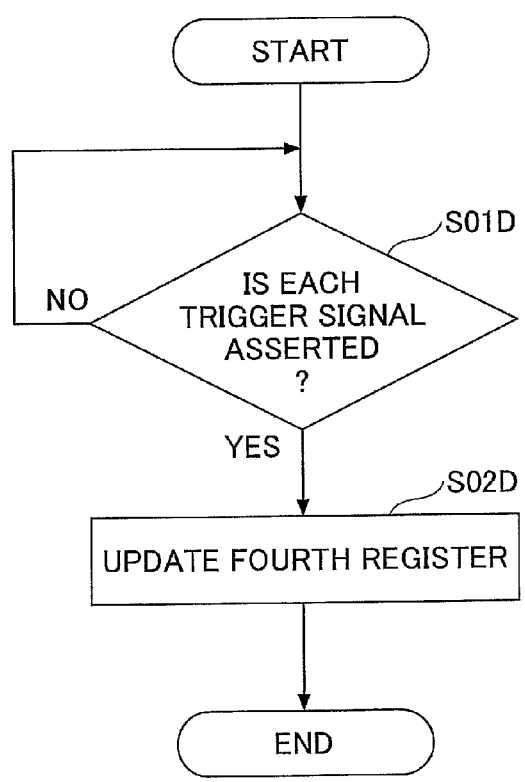

FIG. 4D is a flowchart illustrating an example of a process of updating the module registers included in the fourth register R4 (FIG. 2). It should be noted that the process illustrated in FIG. 4D is performed for each of the module registers.

In step S01D, the ASIC 100H3 determines whether each of the trigger signals is asserted. Specifically, for example, in the case of the first module register R41, the ASIC 100H3 determines whether the first trigger signal TRG1 (FIG. 2) is asserted. When it is determined that the first trigger signal TRG1 is asserted (YES in step S01D), the process of the ASIC 100H3 moves to step S02D. On the other hand, when it is determined that the first trigger signal TRG1 is not asserted (NO in step S01D), the process of the ASIC 100H3 repeats step S01D.

In step S02D, the ASIC 100H3 updates each of the module registers included in the fourth register R4. Specifically, in the case where the first trigger signal TRG1 is asserted, the ASIC 100H3 obtains the common parameters PCOM and the first parameters P1 of the parameters stored in the third register R3. Next, the ASIC 100H3 updates the first module register R41 of the module registers included in the fourth register R4 in such a way that the common parameters PCOM and the first parameters P1 are reflected to the first module register R41.

Figure 5:
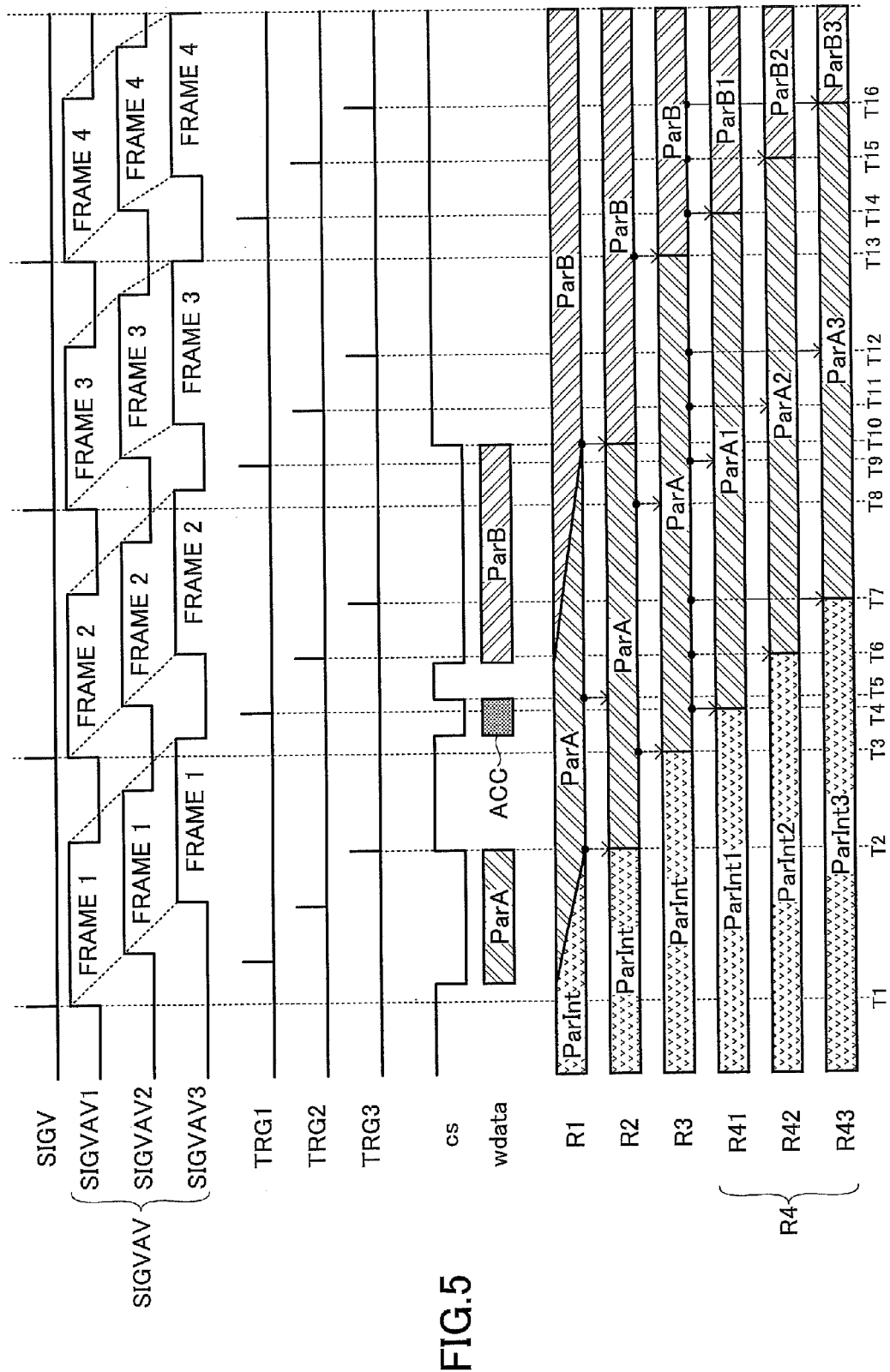
FIG. 5 is a timing chart illustrating an example of a result of an overall process of an image processing apparatus according to an embodiment.

FIG. 5 is a timing chart illustrating an example of a result of an overall process of an image processing apparatus according to an embodiment. FIG. 5 illustrates an example in which, for example, an input of "frame 1", which is a first frame, starts from the first timing T1. It should be noted that, in FIG. 5, the same signals as in FIG. 2 and FIG. 3 are indicated by the same reference numerals, and the description will be omitted.

The second timing T2 is a timing example in which first setting parameters ParA of a register setting "A" have been input to the first register R1 (step S01A in FIG. 4A), and the input is finished at the second timing T2. As illustrated by the second timing T2, it is determined that the input is finished when the chip select (cs) signal is negated. In this example, it is determined that the input is finished at the second timing T2 (YES in step S01B of FIG. 4B), and the first setting parameters ParA are obtained from the first register R1. Next, when the first setting parameters ParA are obtained, the second register R2 is updated from initial setting parameters ParInt to the first setting parameters ParA (step S02B in FIG. 4B).

Next, it is assumed that an input of "frame 2" as a second frame is started from a third timing T3. At the third timing T3, the input vertical synchronization signal SIGV is asserted (YES in step S01C of FIG. 4C), and thus, the first setting parameters ParA are obtained from the second register R2. Next, when the first setting parameters ParA are obtained, the third register R3 is updated from the initial setting parameters ParInt to the first setting parameters ParA (step S02C in FIG. 4C).

Next, when the trigger signals are output (YES in step S01D of FIG. 4D), corresponding module registers included in the fourth register R4 are updated (step S02D in FIG. 4D). Specifically, when the first trigger signal TRG1 is output, the first module register R41 is updated. Further, when the second trigger signal TRG2 is output, the second module register R42 is updated, and when the third trigger signal TRG3 is output, the third module register R43 is updated. It should be noted that the trigger signals are high-active signals.

At the fourth timing T4, the first trigger signal TRG1 is output (YES in step S01D of FIG. 4D). As a result, at the fourth timing T4, the common parameters PCOM and the first parameters P1 of the parameters stored in the third register R3 are obtained by the first module register R41. Here, it is assumed that the common parameters PCOM and the first parameters P1 indicated by the initial setting parameters ParInt are referred to as initial parameters for the first module ParInt1. Further, it is assumed that the common parameters PCOM and the first parameters P1 indicated by the first setting parameters ParA are referred to as first parameters for the first module ParA1. In this case, at the fourth timing T4, the first module register R41 is updated from the initial parameters for the first module ParInt1 to the first parameters for the first module ParA1 (step S01D in FIG. 4D).

At the sixth timing T6, the second trigger signal TRG2 is output (YES in step S01D of FIG. 4D). As a result, at the sixth timing T6, the common parameters PCOM and the second parameters P2 of the parameters stored in the third register R3 are obtained by the second module register R42. Here, it is assumed that the common parameters PCOM and the second parameters P2 indicated by the initial setting parameters ParInt are referred to as initial parameters for the second module ParInt2. Further, it is assumed that the common parameters PCOM and the second parameters P2 indicated by the first setting parameters ParA are referred to as first parameters for the second module ParA2. In this case, at the sixth timing T6, the second module register R42 is updated from the initial parameters for the second module ParInt2 to the first parameters for the second module ParA2 (step S01D in FIG. 4D).

At the seventh timing T7, the third trigger signal TRG3 is output (YES in step S01D of FIG. 4D). As a result, at the seventh timing T7, the common parameters PCOM and the third parameters P3 of the parameters stored in the third register R3 are obtained by the third module register R43. Here, it is assumed that the common parameters PCOM and the third parameters P3 indicated by the initial setting parameters ParInt are referred to as initial parameters for the third module ParInt3. Further, it is assumed that the common parameters PCOM and the third parameters P3 indicated by the first setting parameters ParA are referred to as first parameters for the third module ParA3. In this case, at the seventh timing T7, the third module register R43 is updated from the initial parameters for the third module ParInt3 to the first parameters for the third module ParA3 (step S01D in FIG. 4D).

Next, it is assumed that an input of "frame 3" as a third frame is started from an eighth timing T8. At the eighth timing T8, similar to the third timing T3, the input vertical synchronization signal SIGV is asserted. Therefore, at the eighth timing T8, the input vertical synchronization signal SIGV is asserted (YES in step S01C of FIG. 4C), and thus, the first setting parameters ParA are obtained from the second register R2. When the first setting parameters ParA are obtained, the third register R3 is updated to the first setting parameters ParA (step S02C in FIG. 4C). At the eighth timing T8, there is no state change in the third register R3 because the first setting parameters ParA have already been stored in the third register R3.

At the eighth timing T8, as illustrated in the figure, the first register R1 is being updated from the first setting parameters ParA to the second setting parameters ParB of a register setting "B". This is an example of a case where the start timing of parameter input for the first register R1 is delayed due to a register access ACC, etc. In other words, in FIG. 5, the first register R1 is used until the fifth timing T5 due to the register access ACC. As a result, the start timing of an input of the second setting parameters ParB for the first register R1 is delayed until the fifth timing T5 or later. As a result, in FIG. 5, the input of the second setting parameters ParB is not finished even at the eighth timing T8 of the next frame start, and a write access state is continued.

In other words, this is an example in which the update to the second setting parameters ParB is performed over two frames from "frame 2" to "frame 3". Even in the case like this, it is possible for the modules to perform respective image processes for "frame 2" by using the parameters of the register setting "A". Specifically, it is possible for the first module IMG1 (FIG. 2) to perform the image process for the first frame effective signal SIGVAV1 of the "frame 2" by using the parameters of the register setting "A". Similarly, it is possible for the second module IMG2 (FIG. 2) to perform the image process for the second frame effective signal SIGVAV2 of the "frame 2" by using the parameters of the register setting "A". Especially, it is possible for the third module IMG3 (FIG. 2) to perform the image process for the third frame effective signal SIGVAV3 of the "frame 2" by using the parameters of the register setting "A" even the input vertical synchronization signal SIGV is asserted at the eighth timing T8 while performing the image process.

Further, the fourth register R4 obtains the first setting parameters ParA stored in the third register R3 when trigger signals are respectively output at the ninth timing T9, at the eleventh timing T11, and at the twelfth timing T12. The second setting parameters ParB whose input is finished at the tenth timing T10 is reflected to the second register R2 at the tenth timing T10, and are obtained by the third register R3 at the timing when an input of the fourth frame "frame 4" is started.

In other words, at the thirteenth timing T13, the input vertical synchronization SIGV indicating the start of an input of the "frame 4" is asserted. As a result, at the thirteenth timing T13, the third register R3 obtains the second setting parameters ParB from the second register R2, and is updated from the first setting parameters ParA to the second setting parameters ParB.

It should be noted that the module registers included in the fourth register R4 are respectively updated to the parameters indicated by the second setting parameters ParB at the fourteenth timing T14, at the fifteenth timing T15, and at the sixteenth timing T16. Specifically, at the fourteenth timing T14, the first module register R41 is updated from the first parameters for the first module ParA1 to the second parameters for the first module ParB1 according to the second setting parameters ParB. Similarly, at the fifteenth timing T15, the second module register R42 is updated from the first parameters for the second module ParA2 to the second parameters for the second module ParB2 according to the second setting parameters ParB. Further, at the sixteenth timing T16, the third module register R43 is updated from the first parameters for the third module ParA3 to the second parameters for the third module ParB3 according to the second setting parameters ParB.

As a result, it is possible for the first module IMG1, the second module IMG2, and the third module IMG3 to perform the corresponding image processes for the same frame by using the same parameters. Especially, it is possible for the image processing unit to perform the image process by using the same parameters without having the parameters changed in the middle of the process during a frame period even if the input vertical synchronization signal SIGV, etc., are asserted while the image process is being performed.

It should be noted that the register access ACC includes, for example, a read access or an access for a module other than the parameters related to the image process. The cause that the start timing of an input of the second setting parameters ParB is delayed is not limited to the register access ACC, and may be another reason.

<Structure Example of Image Processing Unit>

Figure 6:
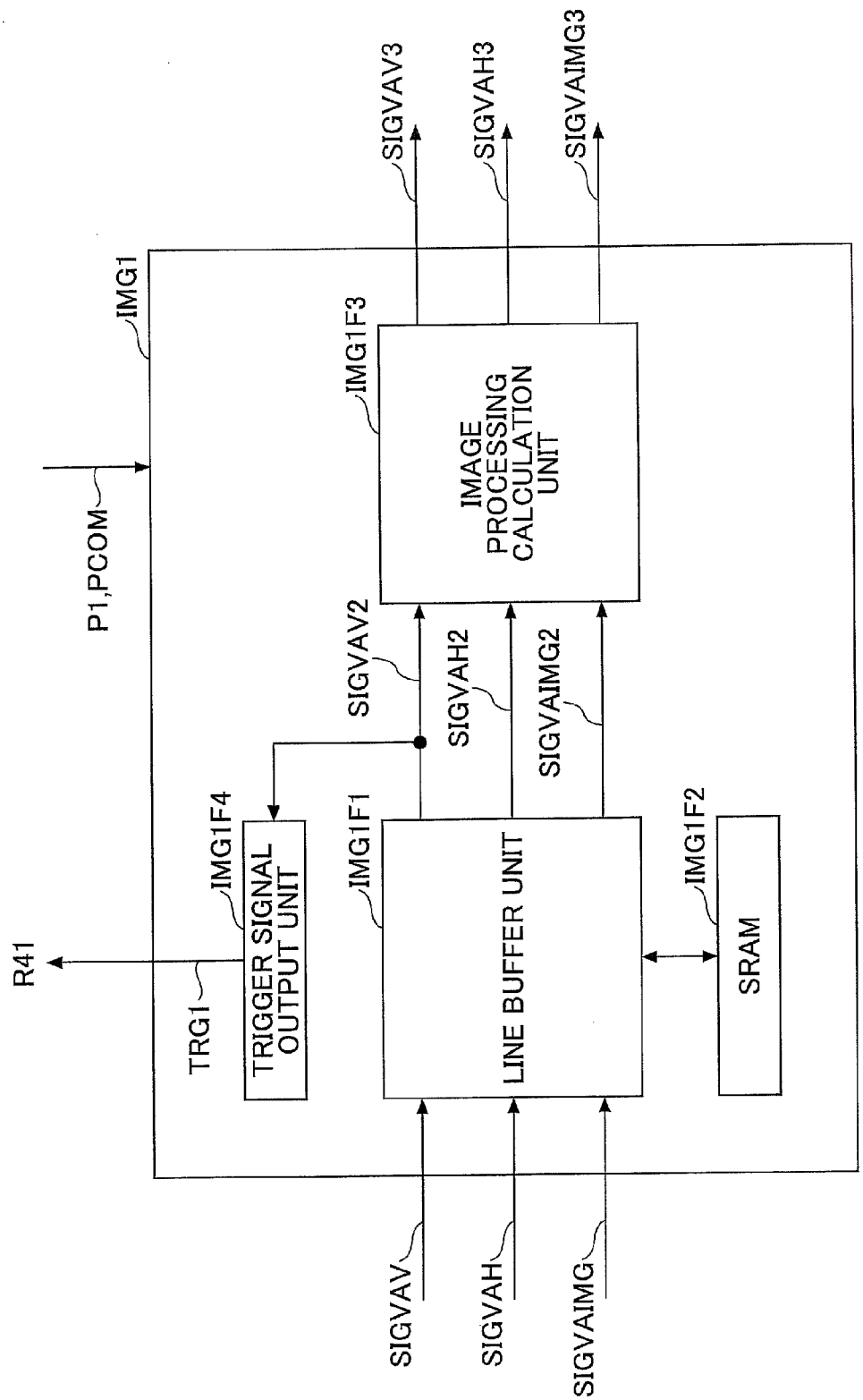
FIG. 6 is a block diagram illustrating an example of a structure of an image processing unit included in an image processing apparatus according to an embodiment.

FIG. 6 is a block diagram illustrating an example of a structure of an image processing unit included in an image processing apparatus according to an embodiment. In the following, referring to FIG. 6, the first module IMG1 illustrated in FIG. 2 will be described as an example. It should be noted that the second module IMG2 and the third module IMG3 illustrated in FIG. 2 include, for example, the same structure as the first module IMG1. However, the modules may include different structures depending on the kinds of image processes performed by the modules.

For example, the first module IMG1 includes a line buffer unit IMG1F1, a static random access memory (SRAM) IMG1F2, an image process calculation unit IMG1F3, and a trigger signal output unit IMG1F4.

The line buffer unit IMG1F1 stores image data input by the effective image data signal SIGVAIMG in the SRAM IMG1F2. Further, the line buffer unit IMG1F1 outputs data of multiple lines to the image process calculation unit IMG1F3 from the SRAM IMG1F2. In the case where the image process calculation unit IMG1F3 performs a process which uses multiple lines such as a filtering process, the line buffer unit IMG1F1 outputs the data of multiple lines to the image process calculation unit IMG1F3 as described above.

For example, in the case where a filtering process related to a reference range of 5 pixels by 5 lines is performed, a five-line amount of image data is stored in the SRAM IMG1F2 in the filtering process, the five lines including two lines each before and after the pixel of interest and a line of the pixel of interest. In this case, the line buffer unit IMG1F1 outputs to the image process calculation unit IMG1F3 twenty five pixel amount of data corresponding to the 5 pixels by 5 lines from the five line amount of the image data. Therefore, a delay is created from the input to the first module IMG1 to the output from the first module IMG1 because the image process for the pixel of interest is performed by the image process calculation unit IMG1F3 after the data of two lines of the latter stage relative to the pixel of interest has been input.

The image process calculation unit IMG1F3 performs calculation according to the contents of an algorithm of the image process. The first parameters P1 and the common parameters PCOM are used by the image process calculation unit IMG1F3, etc. For example, in the case where the image process calculation unit IMG1F3 performs a filtering process, the first parameters P1 are values of filter coefficients, etc. Further, the common parameters PCOM are, for example, values indicating a horizontal direction and a vertical direction of an image, that is, values indicating an image size, etc.

The image process calculation unit IMG1F3 inputs parameters used for calculation related to the image process as the first parameters P1 and the common parameters PCOM. As a result, the trigger signal output unit IMG1F4 generates the first trigger signal TRG1 based on the vertical synchronization signal input to the image process calculation unit IMG1F3, and outputs to the first module register R41. When the first trigger signal TRG1 is output from the trigger signal output unit IMG1F4, the first module IMG1 inputs the first parameters P1 and the common parameters PCOM from the first module register R41.

Figure 7:
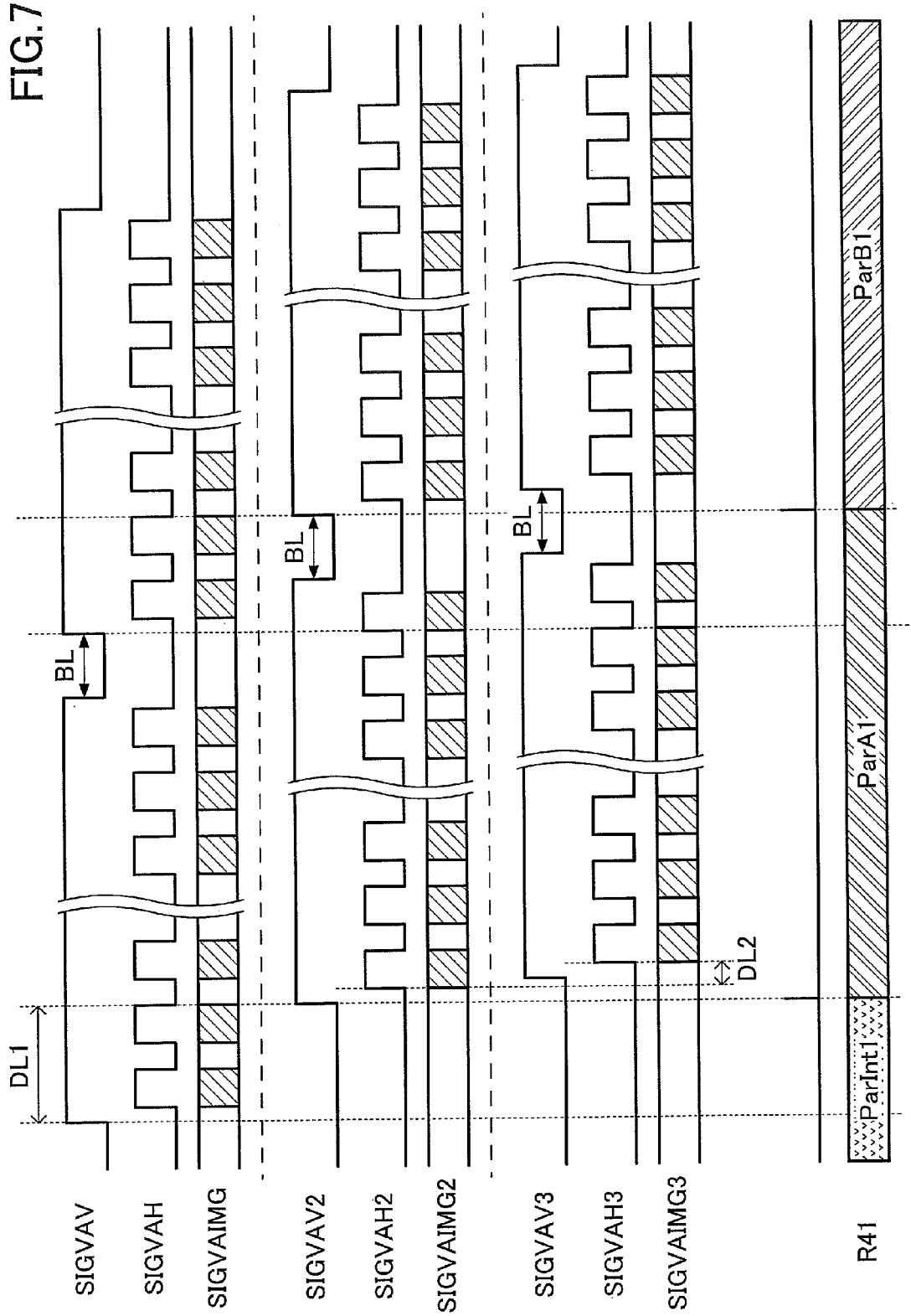
FIG. 7 is a timing chart illustrating an example of an operation related to an image processing unit included in an image processing apparatus according to an embodiment.

FIG. 7 is a timing chart illustrating an example of an operation related to an image processing unit included in an image processing apparatus according to an embodiment. FIG. 7 illustrates an example in which a filtering process of 5 pixels×5 lines is performed by the first module IMG1 illustrated in FIG. 6.

It is assumed that input signals to the first module IMG1 are the frame effective signal SIGVAV, the line effective signal SIGVAH, and the effective image data signal SIGVAIMG. On the other hand, there is a delay between the input signal to the first module IMG1 and the output signal from the line buffer unit IMG1F1 (FIG. 6) in order to store image data necessary for the filtering process.

In the following, it is assumed that output signals from the line buffer unit IMG1F1 are a second frame effective signal SIGVAV2, a second line effective signal SIGVAH2, and a second effective image data signal SIGVAIMG2. Further, it is assumed that output signals from the image process calculation unit IMG1F3 (FIG. 6) are a third frame effective signal SIGVAV3, a third line effective signal SIGVAH3, and a third effective image data signal SIGVAIMG3. Further, in FIG. 7, it is assumed that a delay amount from the input to the first module IMG1 to the output from the line buffer unit IMG1F1 is a first delay amount DL1. Further, in FIG. 7, it is assumed that a delay amount from the output from the line buffer unit IMG1F1 to the output from the image process calculation unit IMG1F3 (FIG. 6) is a second delay amount DL2.

Specifically, in this example, the first delay amount DL1 is an amount of two lines. In other words, in order to perform the filtering process, the line buffer unit IMG1F1 stores the image data including the two lines amount of image data of the latter stage relative to the pixel of interest. The first delay amount DL1 occurs due to this buffering.

Further, the second delay amount DL2 is a latency of a pipeline process by the image process calculation unit IMG1F3. In other words, the second delay amount DL2 is a clock cycle amount of the pipeline process by the image process calculation unit IMG1F3. For example, in the filtering process, multiplication is performed in which filter coefficients are multiplied with the pixel of interest and pixels surrounding the pixel of interest, and further, a process is performed in which the results of multiplication are summed, etc. Therefore, in the image process calculation unit IMG1F3, a delay is created due to the calculation.

Therefore, in the first module IMG1, there are the first delay amount DL1 and the second delay amount DL2 from an input to an output. In an example illustrated in FIG. 7, at least two lines amount of delay occurs. On the other hand, in an example illustrated in FIG. 7, there are a few blank BLs between frames. For example, if it is assumed that the blank BL is a line, then the blank BL is greater than the delay amount due to the first module IMG1. In such a case, there is a case where the image process calculation unit IMG1F3 of the subsequent stage is still performing the image process of "frame 1" when the line buffer unit IMG1F1, etc., of the pre-stage have finished the image process of "frame 1". Therefore, there is a case where it is necessary to hold the parameters for "frame 1" even when an input of the next frame "frame 2" has been started.

Specifically, in FIG. 7, it is necessary for the first parameters for the first module ParA1 to be held until the image process calculation unit IMG1F3 finishes the process of "frame 2".

In an embodiment, the first module register R41 is updated by the first trigger signal TRG1. Therefore, it is possible for the first module register R41 to hold the first parameters for the first module ParA1 until the image process calculation unit IMG1F3 finishes the process of "frame 2". It should be noted that the first module register R41 and the second module register R42 can be updated at different timings. As a result, even in the case where the modules process different frames, it is possible for the module registers to cause the same parameters to be used for the image processes of the corresponding frames.

Further, the first module register R41 selects and obtains the first parameters P1 (FIG. 6) and the common parameters PCOM (FIG. 6) of the input parameters, which parameters P1 and PCOM are used by the first module IMG1 for the image processing. Therefore, the number of the parameters can be reduced. Therefore, it is possible for the first module register R41 to be quickly updated because the number of the parameters is small.

Comparative Example

Figure 8:
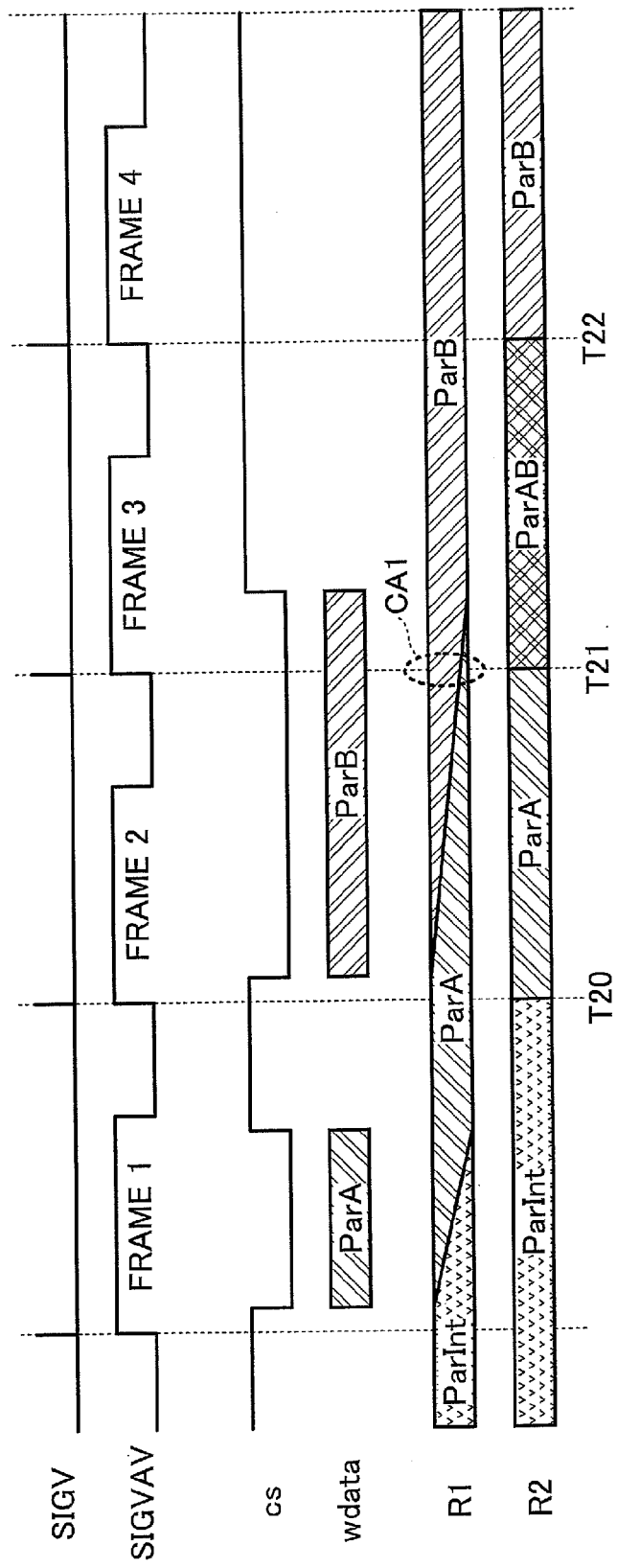
FIG. 8 is a timing chart illustrating an example of a result of an overall process of an image processing apparatus according to a first comparative example.

FIG. 8 is a timing chart illustrating an example of a result of an overall process of an image processing apparatus according to a first comparative example. FIG. 8 illustrates an example in which parameters are input to the first register R1, and the image process is performed by using the parameters stored in the second register R2.

First, during a "frame 1" period, the first setting parameters ParA of the register setting "A" are input to the first register R1. Next, at the beginning of the "frame 2", that is, at the twentieth timing T20, the second register R2 is updated by obtaining the parameters stored in the first register R1. With the above operation, the parameters stored in the second register R2 are updated from the initial setting parameters ParInt to the first setting parameters ParA.

However, there is a case, for example, where a setting amount of registers is large like the second setting parameters ParB of the register setting "B", or a case where a frame period is short, etc. In this case, as in a first case CA1, an input of the second setting parameters ParB to the first register R1 is not finished during the "frame 1" period. In such cases, at the twenty first timing T21, mixed parameters ParAB in which the first setting parameters ParA and the second setting parameters ParB are mixed are obtained by the second register R2. Therefore, the second register R2 is updated from the first setting parameters ParA to the mixed parameters ParAB.

In this case, there may be a frame for which the image process is performed with the mixed parameters ParAB.

Figure 9:
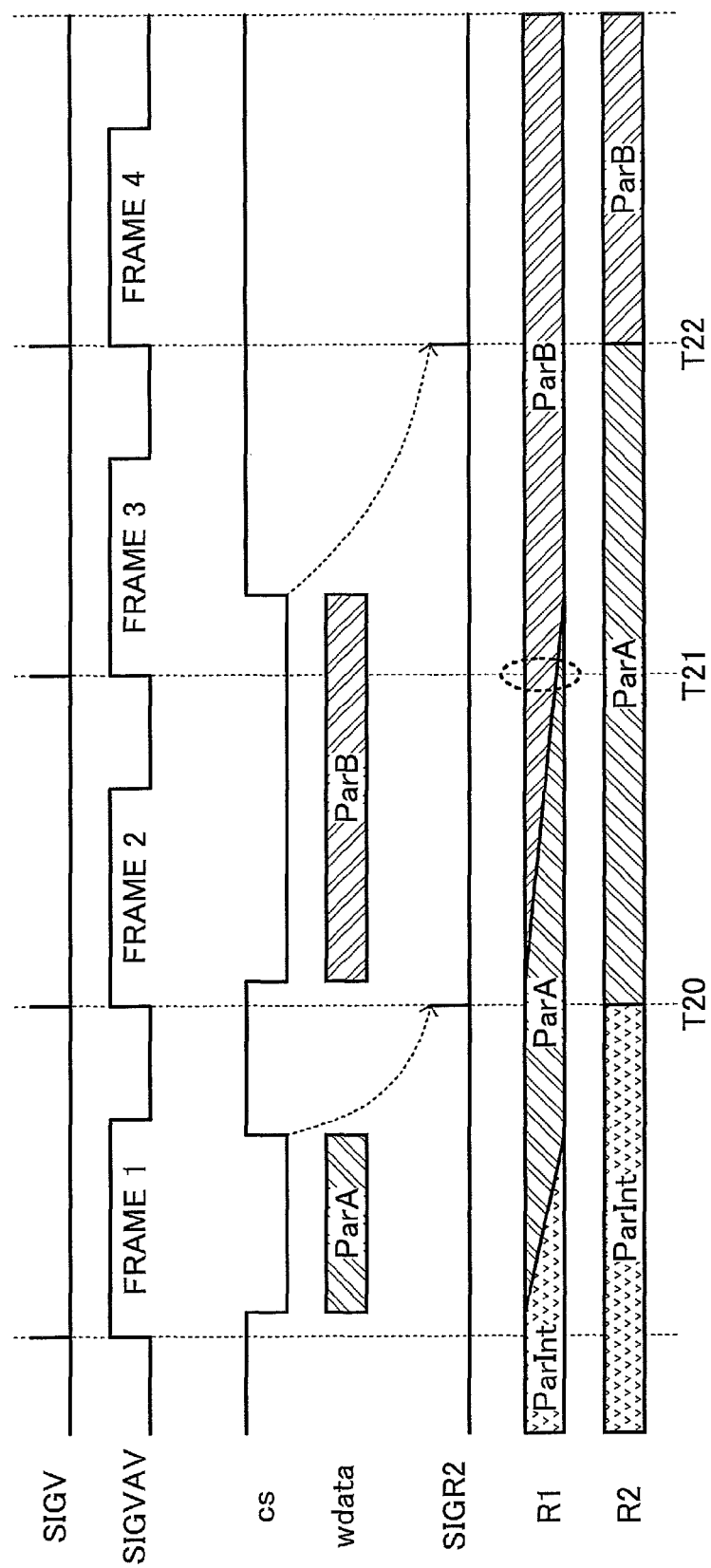
FIG. 9 is a timing chart illustrating an example of a result of an overall process of an image processing apparatus according to a second comparative example.

FIG. 9 is a timing chart illustrating an example of a result of an overall process of an image processing apparatus according to a second comparative example. In FIG. 9, the same elements as in FIG. 8 are indicated by the same name and the same reference numerals, and the description will be omitted. Compared with FIG. 8, FIG. 9 is different in that there is a second register update signal SIGR2.

As illustrated in the figure, after the chip select (cs) signal is negated, the second register update signal SIGR2 is asserted when the input vertical synchronization signal SIGV is asserted. It should be noted that it is assumed that the second register update signal SIGR2 is a high active signal. In this example, at the twenty first timing T21, the input of the second setting parameters ParB to the first register R1 is not finished. As a result, the second register update signal SIGR2 is not asserted. In this case, the second register update signal SIGR2 is asserted at the twenty second timing T22.

Figure 10:
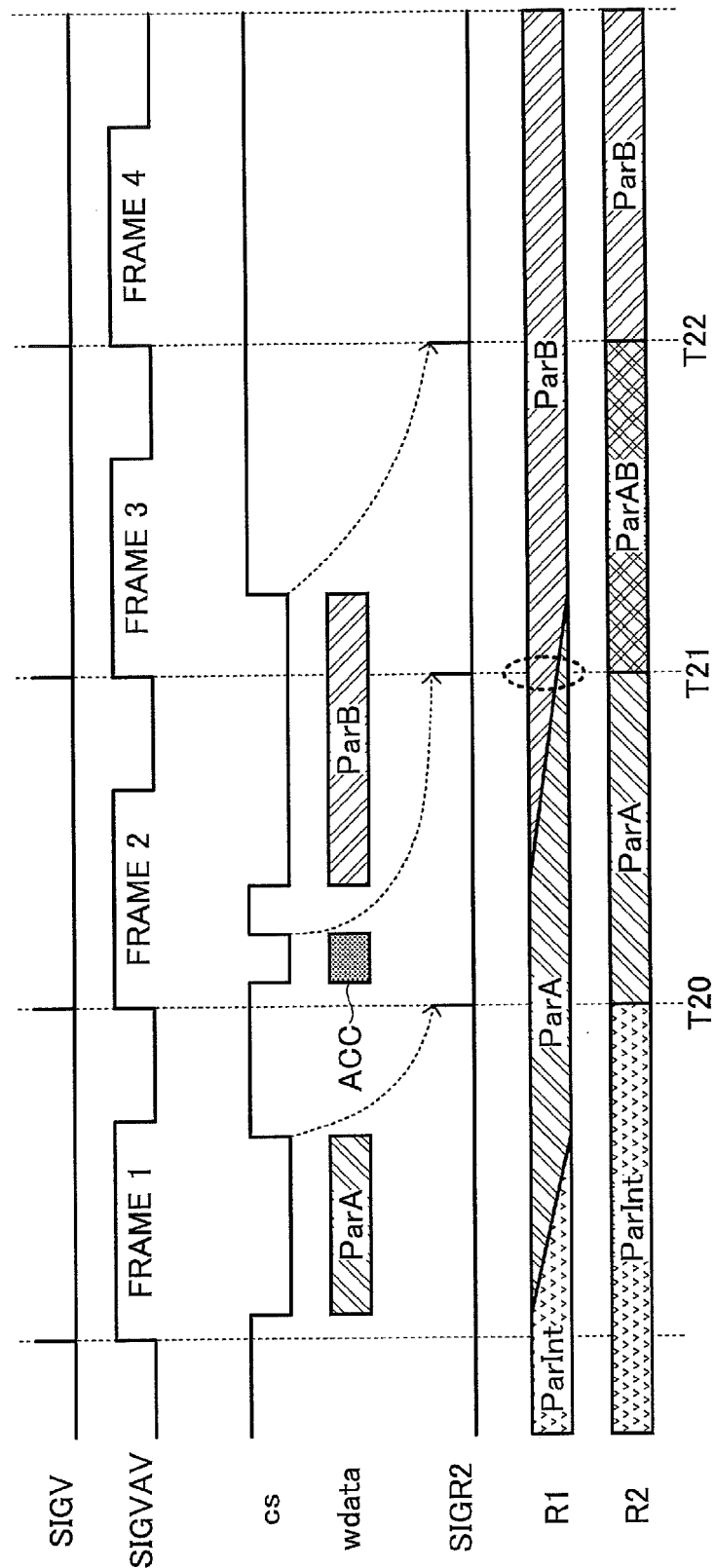
FIG. 10 is a timing chart illustrating an example of another result of an overall process of an image processing apparatus according to a second comparative example.

FIG. 10 is a timing chart illustrating an example of another result of an overall process of an image processing apparatus according to the second comparative example. Compared with FIG. 9, FIG. 10 is different in that the register access ACC is performed. As illustrated in the figure, the chip select (cs) signal is also negated in the case where the register access ACC such as a write access is performed. As a result, at the twenty first timing 121, there is a case where the second register update signal SIGR2 is asserted even when the input of the second setting parameters ParB to the first register R1 are not finished. With the above operation, similar to the case illustrated in FIG. 8, there is a case where the mixed parameters ParAB are obtained by the second register R2 at the twenty first timing T21. Therefore, there is a case where the second register R2 is updated from the first setting parameters ParA to the mixed parameters ParAB. Therefore, there may be a case where the image process is performed for a frame by using the mixed parameters ParAB.

Figure 11:
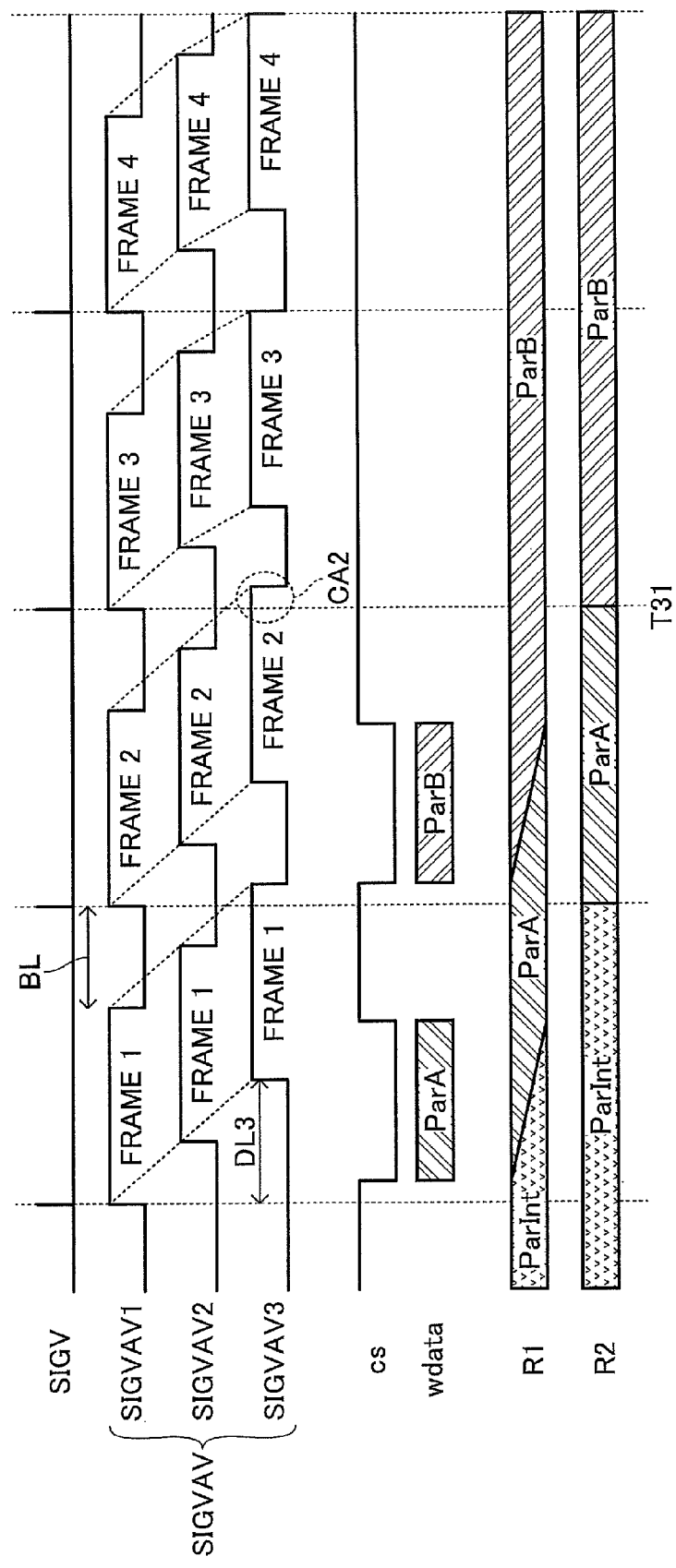
FIG. 11 is a timing chart illustrating an example of a result of an overall process of an image processing apparatus according to a first comparative example or a second comparative example.

FIG. 11 is a timing chart illustrating an example of a result of an overall process of an image processing apparatus according to the first comparative example or the second comparative example. FIG. 11 illustrates an example of a case where the process is performed by an image processing apparatus according to the first comparative example illustrated in FIG. 8 or the second comparative example illustrated in FIG. 9. There is a case where the image processing modules included in the image processing apparatus include a line buffer, etc. When a process is performed, which process uses a line buffer, etc., it is often the case that a third delay amount DL3 occurs. There is a case where the blank BL between frames is less than the third delay amount DL3.

In such a case, there is a case where the former-stage image processing module and the latter-stage image processing module process different frames. Specifically, at the thirty first timing T31, the image process for the first frame effective signal SIGVAV1 is performed for the "frame 3". On the other hand, at the thirty first timing T31, the image process for the third frame effective signal SIGVAV3 is performed for the "frame 2".

Therefore, if the parameters are updated at the thirty first timing T31, then the process for the "frame 2", of the image process for the third frame effective signal SIGVAV3, after the thirty first timing T3 is performed with the updated parameters. Therefore, there is a case where the image process for the third frame effective SIGVAV3 is performed in such a way that the image process by using the first setting parameters ParA is performed for one part of the "frame 2" and the image process by using the second parameters ParB is performed for another part of the "frame 2", and thus, an image is generated in which the one part processed by using the first setting parameters ParA and the other part processed by using the second setting parameters ParB are mixed. In other words, there is a case where, as illustrated in the second case CA2, the image process is performed for the same frame by using different parameters switched in the middle of the process.

It should be noted that an embodiment is not limited to a case where the image processing apparatus performs three kinds of image processes. For example, the image processing apparatus may perform two or less kinds of image processes or four or more kinds of image processes. In this case, the number of module registers included in the fourth register may be changed according to the number of the kinds of parameters, etc., used for the image processes.

As described above, preferable embodiments of the present disclosure have been described. The present disclosure is not limited to the specific embodiments and various variations and modifications can be made within the scope of the present disclosure described in the claims.

What is claimed is:

1. An image processing apparatus for performing image processes based on parameters, the image processing apparatus comprising:
   a first storage unit to which the parameters are input;
   a second storage unit configured to obtain the parameters stored in the first storage unit after the input is finished;
   a third storage unit configured to obtain the parameters stored in the second storage unit in response to a signal indicating the beginning of a frame of an image;

a fourth storage unit configured to obtain, in response to a first trigger signal, a first subset of the parameters stored in the third storage unit related to a first image process, and to obtain, in response to a second trigger signal, a second subset of the parameters stored in the third storage unit related to a second image process;

a first image processing unit configured to perform the first image process based on the first subset of the parameters; and a second image processing unit configured to perform the second image process based on the second subset of the parameters.

2. The image processing apparatus according to claim 1, wherein common parameters commonly used by the first image process and the second image process are included in the first subset of the parameters and the second subset of the parameters.

3. The image processing apparatus according to claim 1, wherein the parameters are input to the first storage unit by burst transfer.

4. The image processing apparatus according to claim 1, wherein the parameters are input to the first storage unit according to a first interface or a second interface.

5. The image processing apparatus according to claim 4, wherein the first interface is a Serial Peripheral Interface (SPI).

6. The image processing apparatus according to claim 4, wherein the second interface is a Universal Asynchronous Receiver Transmitter (UART).

7. The image processing apparatus according to claim 4, wherein it is determined whether an access is according to the first interface or according to the second interface, and in the case where it is determined that the access is according to the second interface, the second storage unit obtains the parameters stored in the first storage unit at a predetermined timing.

8. The image processing apparatus according to claim 1, wherein the second storage unit, the third storage unit, and the fourth storage unit obtain the parameters, respectively while the first image process or the second image process is being performed.

9. An image processing apparatus for performing image processes based on parameters, the image processing apparatus comprising:

a first storage unit to which the parameters are input;

a second storage unit configured to obtain the parameters stored in the first storage unit after the input is finished;

a third storage unit configured to obtain the parameters stored in the second storage unit in response to a signal indicating the beginning of a frame of an image;

a fourth storage unit configured to obtain the parameters stored in the third storage unit for corresponding image processes based on trigger signals output at predetermined timings; and image processing units configured to perform the corresponding image processes based on the parameters obtained by the fourth storage unit.

10. An image processing apparatus for performing image processes based on parameters, the image processing apparatus comprising:

a first storage means for having the parameters be input;

a second storage means for obtaining the parameters stored in the first storage means after the input is finished;

a third storage means for obtaining the parameters stored in the second storage means in response to a signal indicating the beginning of a frame of an image;

a fourth storage means for obtaining, in response to a first trigger signal, a first subset of the parameters stored in the third storage means related to a first image process, and to obtain, in response to a second trigger signal, a second subset of the parameters stored in the third storage means related to a second image process;

a first image processing means for performing the first image process based on the first subset of the parameters; and a second image processing means for performing the second image process based on the second subset of the parameters.

* * * * *